Dec. 6, 1960  W. A. ESCHENBURG  2,963,054
TENSION ADJUSTING MECHANISM FOR BAND SAWS
Filed April 9, 1958  2 Sheets-Sheet 1
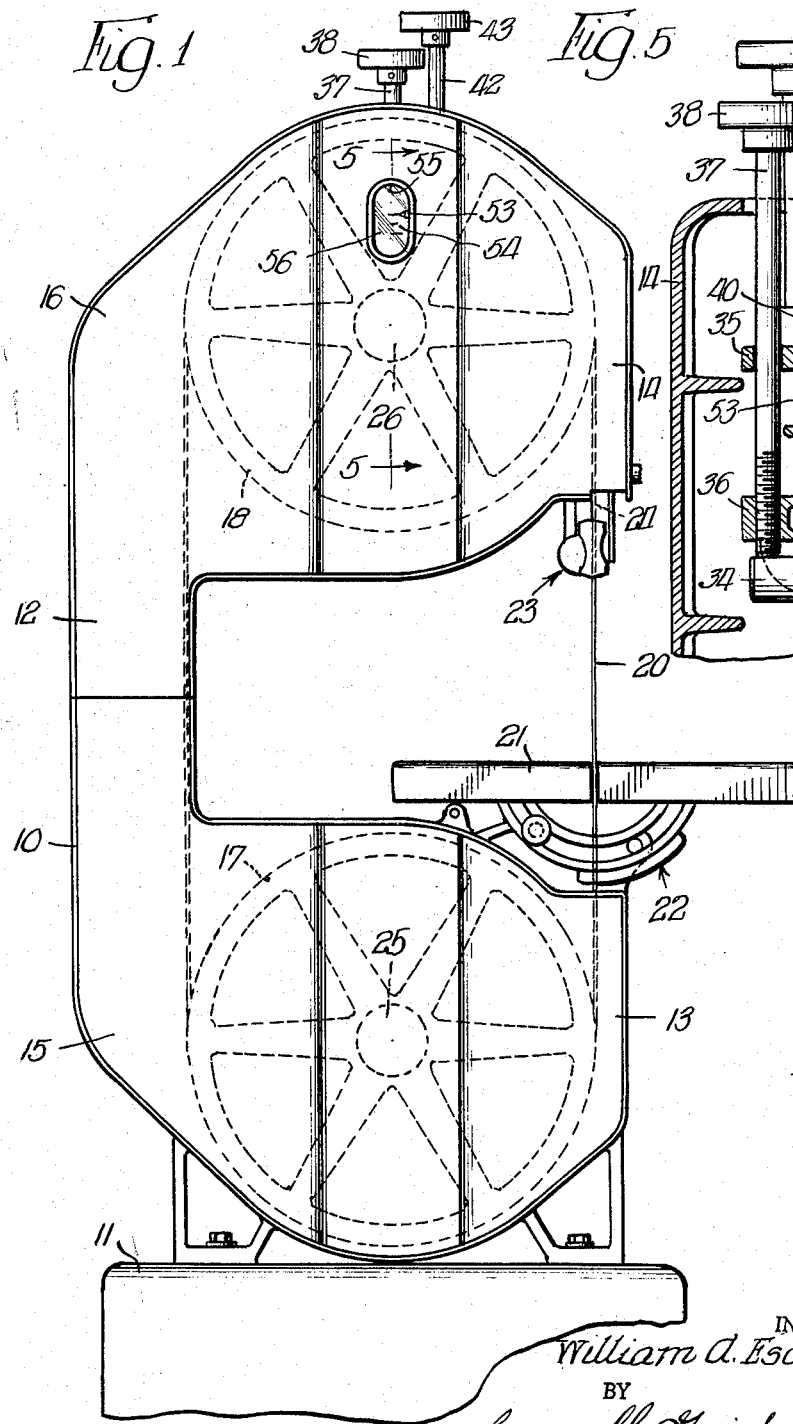
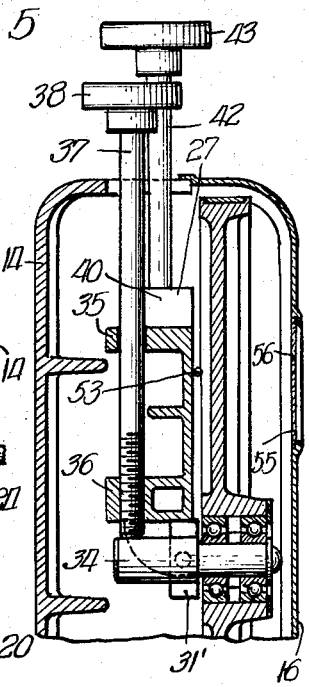
INVENTOR.
William A. Eschenburg,
BY
Cromwell, Greist & Warden
Attys Dec. 6, 1960  W. A. ESCHENBURG  2,963,054
TENSION ADJUSTING MECHANISM FOR BAND SAWS
Filed April 9, 1958  2 Sheets-Sheet 2
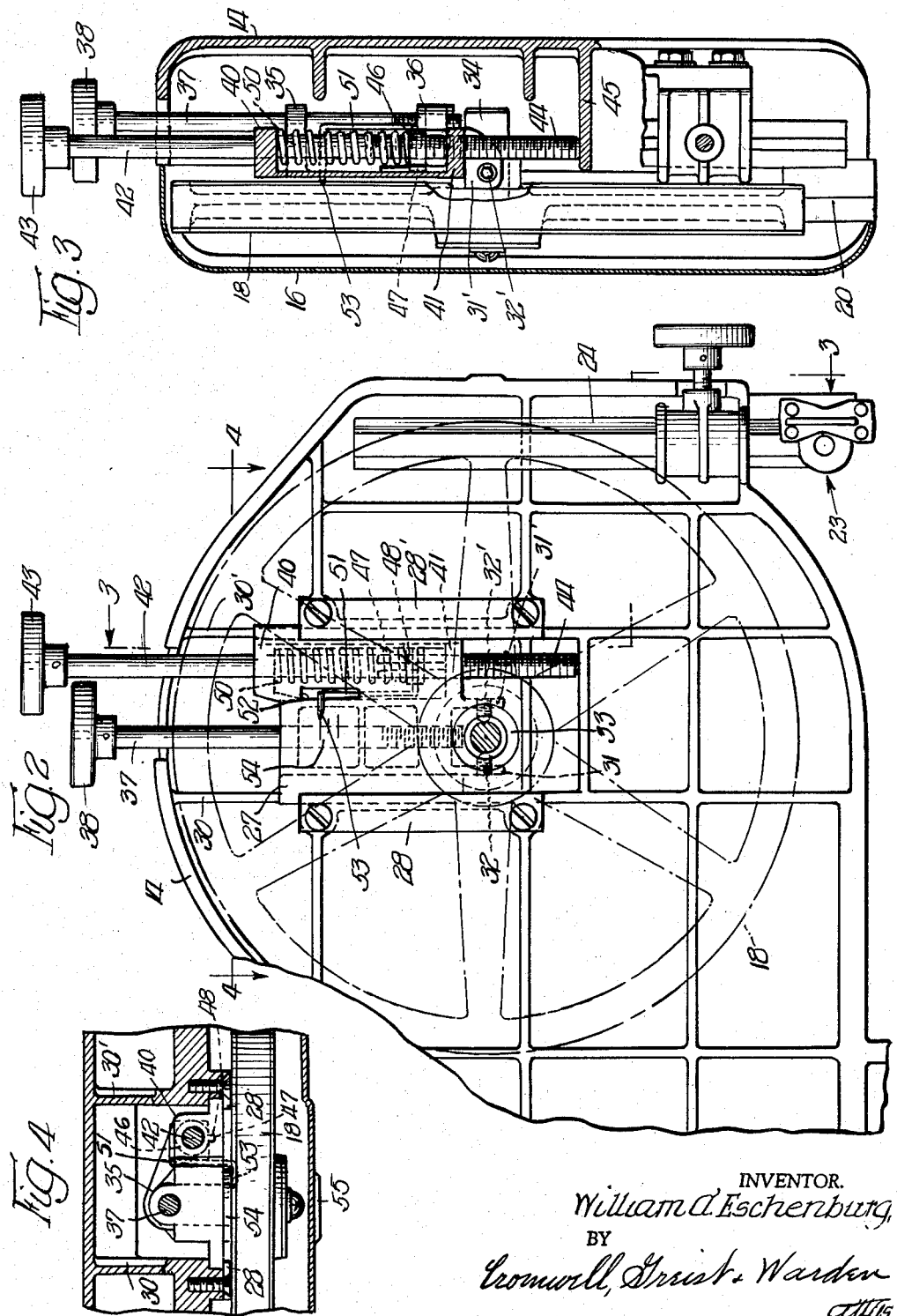
INVENTOR.
William A. Eschenburg,
BY
Cromwell, Greist & Warden
ATTYS

United States Patent Office 2,963,054
Patented Dec. 6, 1960

2,963,054

TENSION ADJUSTING MECHANISM FOR BAND SAWS

William A. Eschenburg, Beloit, Wis., assignor to Yates-American Machine Company, Beloit, Wis., a corporation of Delaware Filed Apr. 9, 1958, Ser. No. 727,415

3 Claims. (Cl. 143—27)

This invention relates to a power driven tool and is particularly concerned with improvements in a band saw.

It is a general object of the invention to provide an improved band saw structure wherein provision is made for adjusting the upper blade carrying wheel or pulley from the front of the machine while the machine is in operation.

In operating a band saw, it frequently becomes necessary to change the elevation and/or tilt of the upper blade carrying pulley so as to adjust the tension in the blade and maintain the blade in its proper path where it rides against the guide roller which lies adjacent the work and which engages the rear side of the blade. In most prior machines the upper pulley is mounted so that the operator is required to go to the back of the machine to adjust the same. Since this involves considerable loss of time, it is more desirable to provide an arrangement for adjusting the pulley while the operator is at the front of the machine and, therefore, it is an object of the present invention to provide an improved arrangement for mounting the upper pulley which enables the operator to make the necessary adjustments for proper tracking and tension of the blade from the front of the machine.

It is a more specific object of the present invention to provide in a band saw having a blade carrying upper pulley journaled in a mounting means in an upper pulley compartment and mechanism for adjusting the tension in the blade and the tilt of the pulley which may be operated from the front of the machine and which has associated therewith a gauge for indicating the tension which is visible through a window in the front cover member of the pulley compartment.

It is a further object of the invention to provide a mounting means for the upper pulley of a band saw which has associated therewith blade tracking and tension adjusting means including adjusting screws extending vertically at the top of the machine and within the reach of the operator when he is at the front of the machine and a gauge for indicating the amount of tension in the blade which is arranged so that it may be read by the operator through a window in the front cover of the pulley compartment while the adjustment is being made.

These and other objects and advantages of the invention will be apparent from a consideration of the band saw which is shown by way of illustration in the accompanying drawings wherein:

Figure 1 is an elevation of the front side of a band saw having incorporated therein the principal features of the invention;

Figure 2 is an elevational view of the upper portion of the band saw, with the front cover removed and to an enlarged scale;

Figure 3 is a section taken generally on the line 3—3 of Figure 2 with the cover attached;

Figure 4 is a fragmentary section taken generally on the line 4—4 of Figure 2; and Figure 5 is a fragmentary section taken generally on the line 5—5 of Figure 1, to an enlarged scale.

Referring first to Figure 1 of the drawings, there is illustrated a band saw construction 10 which is adapted to be bolted or otherwise secured in upright position on a suitable base 11. The saw 10 comprises an upright frame structure consisting of a vertical column 12 and lower and upper frame structures 13 and 14 having cover members 15 and 16, respectively, which cooperate therewith to provide upper and lower wheel or pulley receiving compartments. Saw blade supporting wheels or pulleys 17 and 18 are mounted in the lower and upper compartments, respectively, and support the saw blade indicated at 20.

A work supporting table 21 is supported on the lower frame assembly 13. The table 21 is tiltably mounted on a suitable double trunnion structure indicated at 22 and is provided with appropriate saw blade guiding members (not shown) beneath the work supporting surface. A blade guiding and supporting roller mechanism, indicated at 23, is mounted on the lower end of a vertically disposed post 24, the latter being slidably mounted on the upper frame assembly 14 with provision for adjusting its position to vary the distance of the blade guiding and supporting mechanism 23 relative to the work surface of the table 21, in a conventional manner. The table 21 and the blade guiding and supporting structures associated with the same are conventional structures and form no part of the present invention.

The lower blade supporting pulley 17 is journaled in suitable bearings (not shown) mounted on the frame structure 13 and enclosed in the lower compartment for rotation about a fixed axis indicated at 25. The upper blade supporting pulley 18 wheich is in the form of a spoked wheel is located in the upper compartment and journaled in bearing means supported on the upper frame structure 14 to rotate about the axis 26. The bearing means or support for the upper pulley 18 is constructed to permit vertical and tilting adjustment of the pulley 18 in order to adjust the blade for proper tracking on the pulleys 17 and 18 and to provide proper tension in the blade.

The upper pulley 18 is carried on a vertical slide member 27 which has its side edges slidably mounted in guideways formed by the plates 28 and 28' secured on cooperating web members 30 and 30' extending inwardly of the upper frame structure 14 into the upper compartment. The slide plate 27 has a pair of laterally spaced bearing ears 31, 31' (Figure 2) projecting at its lower end which are provided with pivot members 32, 32' carrying between their pointed ends a bearing sleeve 33 in which the shaft 34 is rotatably received, the latter having the spoked pulley or wheel 18 secured on its inner end. The slide plate 27 is provided adjacent its top and bottom ends with rearwardly extending horizontal ears 35 and 36 which are apertured to receive a vertically extending tilt adjusting screw 37. The lower ear 36 is threaded and receives the threaded lower end of the screw 37, the screw being rotatable in the aperture in the upper ear 35. The tilt adjusting screw 37 carries an operating knob 38 at its upper end which extends above the top of the upper pulley receiving compartment and its lower end bears against the top of the bearing sleeve 33 at a point rearwardly of the pivots 32, 32' so that vertical movement of the adjusting shaft 37 tilts the pulley 18 and adjusts the same for proper tracking of the blade 20 thereon.

The slide plate 27 also carries at one side thereof upper and lower rearwardly extending bracket ears or members 40 and 41 which are apertured to receive a tension adjusting screw or shaft 42. The screw 42 extends vertically and has an operating knob 43 on its upper end which also extends above the upper pulley receiving compartment. The lower end portion of screw 42, which is threaded, as indicated at 44, extends in freely rotatable relation through an aperture in the lower bracket member 41 and engages in abutting relation with a forwardly extending web portion 45 of the frame structure 14. The threaded section 44 of the screw 42 carries a nut 46 which is located between the guide forming bracket members 40 and 41. The nut 46 has a lug portion 47 riding in a guideway 48 extending vertically of the rear face of the plate 27 which prevents the nut from rotating relative to the plate 27 while permitting it to travel vertically on the screw 42. A compression spring 50 is arranged on the screw 42 between the nut 46 and the upper bracket member 40 which compression spring urges the slide plate 27 upwardly against the pull of the blade 20 on the pulley 18. The amount of upward pressure exerted on the plate 27 by the spring 50 is adjusted by rotation of the screw 42 which causes the nut 46 to travel either up or down as desired depending upon the direction of rotation of the screw 42.

The nut 46 carries on its rear edge or face a pointer member 51 which is bent so that the upper end extends through a slot 52 in the front face of the plate 27 and terminates in an end portion 53 extending horizontally and parallel with the front face of the plate 27. The plate 27 is scored or lined to provide a scale at 54 which has appropriate marking to indicate the relative position of the pointer end 53 and the plate 27, thereby indicating the tension resulting from the action of the spring 50 as it is compressed by the adjustment of the nut 46.

The front cover 16 of the upper pulley compartment is provided with a window at 55 which may be covered with an appropriate transparent insert 56 and which is of a size and positioned so as to render visible from the front of the machine the scale 54 and the pointer 53.

With the arrangement described, the tension in the blade 20 may be readily adjusted by the operator without leaving his work feeding position at the front of the machine. The knob 43 is within his reach for rotation of the tension adjusting screw 42 and he may observe from the front of the machine through the window 55 the position of the pointer end 53 on the scale 54. With the spoked wheel or pulley 18 the scale 54 will be visible when the pulley is rotating and the operator may make the necessary adjustments at any time while the machine is operating.

While specific materials and particular details of construction have been referred to in describing the form of the machine illustrated, it will be understood that other materials and different structural details may be resorted to within the spirit of the invention.

I claim:

1. In a band saw, a cabinet structure comprising a vertical column and upper and lower wheel support frames extending laterally from one side of said column and having upper and lower saw blade wheels mounted therein, said wheels being rotatably journaled in bearing means carried on said upper and lower wheel support frames, said upper support frame having vertically extending spaced guideways, a slide member mounted in said guideways on the front of said support frame, bearing means for said upper wheel on said slide member, said slide member having vertically spaced bracket ears with vertically aligned apertures, a tension adjusting screw rotatably mounted in said apertures with the lower end thereof in engagement with a projecting portion of said frame structure, an adjusting nut on said screw between said bracket ears, means for holding said adjusting nut against rotation on said screw, a compression spring mounted on said screw between said nut and the uppermost bracket ear for urging said slide member upwardly to tension the blade, a pointer member carried on said nut and extending through said slide member, a tension scale on the front face of said slide member for indicating the movement of said pointer member relative to said slide member, and said upper wheel support frame having a front cover member, said front cover member having an aperture aligned with the scale on said slide member to permit an operator at the front of the machine to observe the scale while adjusting the tension in the blade.

2. In a band saw, a supporting structure comprising a vertical column and upper and lower frames forming wheel compartments extending laterally from one side of said column, upper and lower wheels adapted to carry a saw blade in said upper and lower wheel compartments, a wheel mounting member, guide means in said upper wheel compartment for supporting said wheel mounting member for vertical movement therein, bearing means for said upper wheel on said wheel mounting member, said wheel mounting member having rearwardly extending, vertically spaced portions with vertically aligned apertures therein, a tension adjusting screw rotatably mounted in said vertically aligned apertures with the lower end thereof in engagement with a fixed portion of said upper frame and with the upper end thereof extending upwardly of said upper wheel compartment, an adjusting nut on said screw between the apertured portions of said wheel mounting member, means for holding said adjusting nut against rotation on said screw, a compression spring mounted on said screw between said nut and a portion of said wheel mounting member above said nut for urging said wheel mounting member upwardly to tension the blade, a pointer member carried on said nut, a tension scale on the front face of said wheel mounting member for cooperation with said pointer member to indicate movement of said pointer member relative to said wheel mounting member, and said upper wheel compartment having a front cover member with an opening forming a window opposite said scale to permit an operator at the front of the machine to observe the scale while rotating said tension adjusting screw.

3. In a band saw, a supporting structure comprising a vertical column and upper and lower frame members forming wheel compartments extending laterally from one side of said column, a lower saw blade wheel rotatably journaled in the lower wheel compartment, a spoked upper saw blade wheel rotatably journaled in said upper wheel compartment, said upper wheel compartment having a front cover member and vertically extending spaced guideways on the frame members thereof, a slide member mounted for vertical movement in said guideways, bearing means for said upper wheel carried on said slide member, said slide member having rearwardly extending portions with vertically spaced and vertically aligned guide apertures, a tension adjusting screw rotatably supported in said guide apertures with the lower end thereof in engagement with a fixed frame member and with the upper end extending above said upper wheel compartment, an adjusting nut on the lower portion of said screw and between said guide apertures, means forming a vertical guideway in said slide member for receiving a portion of said adjusting nut in sliding relation and preventing rotation of said nut relative to said slide member, a compression spring mounted on said screw between said nut and a portion of the slide member above said nut for urging said slide member upwardly to tension the blade, a pointer member connected to said nut and having a free end extending over a portion of the front face of said slide member, a cooperating scale on the front face of said slide member for indicating the movement of said pointer member relative to said slide member, and the cover member on said upper wheel compartment having a vertically extending window forming aperture located opposite the scale carrying portion of said slide member to permit an operator at the front of the machine to observe the tension scale while rotating the upper end of said adjusting screw.

References Cited in the file of this patent

UNITED STATES PATENTS

| 120,949 | Doane et al. | Nov. 14, 1871 |
| 173,731 | Lovewell et al. | Feb. 22, 1876 |
| 284,580 | Vernon | Sept. 4, 1883 |
| 2,257,305 | Nickerson | Sept. 30, 1941 |
| 2,463,437 | Steiner | Mar. 1, 1949 |
| 2,492,824 | Ahrndt et al. | Dec. 27, 1949 |
| 2,825,369 | Karp et al. | Mar. 4, 1958 |